(12) United States Patent
Beard et al.

(10) Patent No.: US 7,536,115 B2
(45) Date of Patent: May 19, 2009

(54) SECURELY ADJUSTING SETTING OF AN IMAGE FORMING DEVICE

(75) Inventors: Eric Andrew Beard, Lexington, KY (US); David Ashley Brown, Richmond, KY (US); Bryan Scott Willett, Lexington, KY (US); Edward William Yohon, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 152 days.

(21) Appl. No.: 11/425,576

(22) Filed: Jun. 21, 2006

(65) Prior Publication Data

US 2007/0300060 A1 Dec. 27, 2007

(51) Int. Cl.
G03G 15/00 (2006.01)
(52) U.S. Cl. .................................. 399/8; 399/12; 399/13
(58) Field of Classification Search .................. 399/8, 399/9, 24, 25, 26, 27, 12, 13; 713/201; 380/55, 380/243
See application file for complete search history.

(56) References Cited

U.S. PATENT DOCUMENTS

| 4,742,483 | A |   | 5/1988  | Morrell              |
|-----------|---|---|---------|----------------------|
| 5,483,598 | A |   | 1/1996  | Kaufman et al.       |
| 5,673,385 | A |   | 9/1997  | Mack et al.          |
| 5,861,957 | A |   | 1/1999  | Nagata               |
| 6,144,812 | A |   | 11/2000 | Ueno                 |
| 6,314,521 | B1|   | 11/2001 | Debry                |
| 6,711,677 | B1|   | 3/2004  | Wiegley              |
| 6,918,042 | B1| * | 7/2005  | Debry ............ 726/5 |
| 6,952,780 | B2| * | 10/2005 | Olsen et al. ...... 726/26 |

* cited by examiner

*Primary Examiner*—Hoan H Tran
(74) *Attorney, Agent, or Firm*—Grossman, Tucker, Perreault & Pfleger, PLLC

(57) ABSTRACT

A system, method, and article for sending secured data to an image forming device at a remote location. The secured data is unique to the image forming device or a specific class of image forming devices. The secured data is compared to data stored at the image forming device for verifying the identity of the image forming device. If the identity of the image forming device is verified, a setting adjustment of the image forming device is initiated based on the secured data.

33 Claims, 4 Drawing Sheets

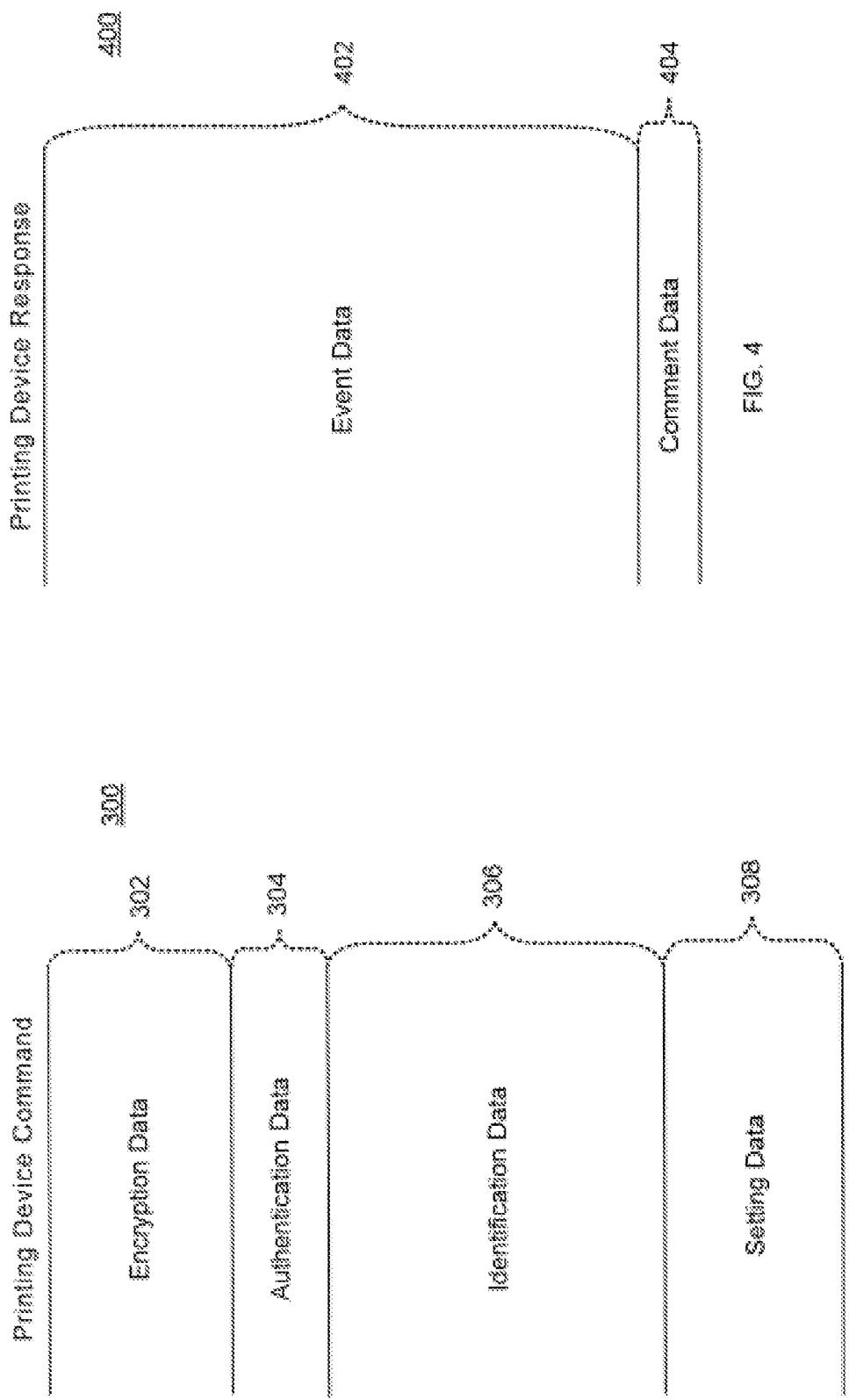

SECURELY ADJUSTING SETTING OF AN IMAGE FORMING DEVICE

TECHNICAL FIELD

This invention relates to adjusting settings of image forming devices and, more particularly, to securely adjusting the settings from a remote location.

BACKGROUND

Printing devices often include toner cartridges that affix toner onto paper or other types of media. Typically, the toner cartridges need to be replaced to replenish the toner supply in the printing device. Toner cartridges may be manufactured in many geographical regions. For example, toner cartridges may be manufactured in the United States or in other regions (e.g., Europe or Asia, etc.). Printing devices may also be manufactured in numerous geographical regions. To reflect the particular region in which a printing device was manufactured, the printing device may electronically store data that identifies the geographic region. Toner cartridges may also store data to identify their region of manufacture. For proper operation between some printing devices and some toner cartridges, both data sets need to match. For example, if a user inserts a toner cartridge (manufactured in one region) into a printing device (manufactured in another region), the printing device may not operate properly with the toner cartridge.

SUMMARY OF THE DISCLOSURE

In one exemplary embodiment, the present invention relates to a system that may include a setting controller that initiates sending of secured data to an image forming device at a remote location. The secured data is unique to the image forming device. The system also includes a verifier & adjuster that initiates comparing the secured data to data stored at the image forming to verify the identity of the image forming device. If the identity of the image forming device is verified, the verifier & adjuster initiates a setting adjustment of the image forming device based on the secured data.

In another exemplary embodiment, the present invention relates to a method that includes sending secured data to an image forming device at a remote location. The secured data is unique to the image forming device. The method also includes comparing the secured data to data stored at the image forming device for verifying the identity of the image forming device. The method also includes, if the identity of the image forming device is verified, initiating a setting adjustment of the image forming device based on the secured data.

In another exemplary embodiment, the present invention relates to a method that includes comparing secured data to data stored at an image forming device to verify the identity of the image forming device. The secured data is received from a remote location and is unique to the image forming device. The method also includes, if the identity of the image forming device is verified, adjusting a setting of the image forming device based on the secured data.

In another exemplary embodiment, the present invention relates to an article that includes a storage medium that stores instructions that when executed by a machine result in the following operations. One operation includes sending secured data to an image forming device at a remote location. The secured data is unique to the image forming device. Another operation includes comparing the secured data to data stored at the image forming device for verifying the identity of the image forming device. Still another operation includes, if the identity of the image forming device is verified, initiating a setting adjustment of the image forming device based on the secured data.

In another exemplary embodiment, the present invention relates to an article that includes a storage medium that stores instructions that when executed by a machine result in the following operations. One operation includes comparing secured data to data stored at an image forming device to verify the identity of the image forming device. The secured data is received from a remote location and is unique to the image forming device. Another operation includes, if the identity of the image forming device is verified, adjusting a setting of the image forming device based on the secured data.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a table that lists data included in a software component that may be securely inserted in the electronic mail message shown in FIG. 2;

FIG. 4 is a table that lists data included in a software component that may be provided by a printing device in response to the software component represented in FIG. 3;

DETAILED DESCRIPTION

Figure 1:
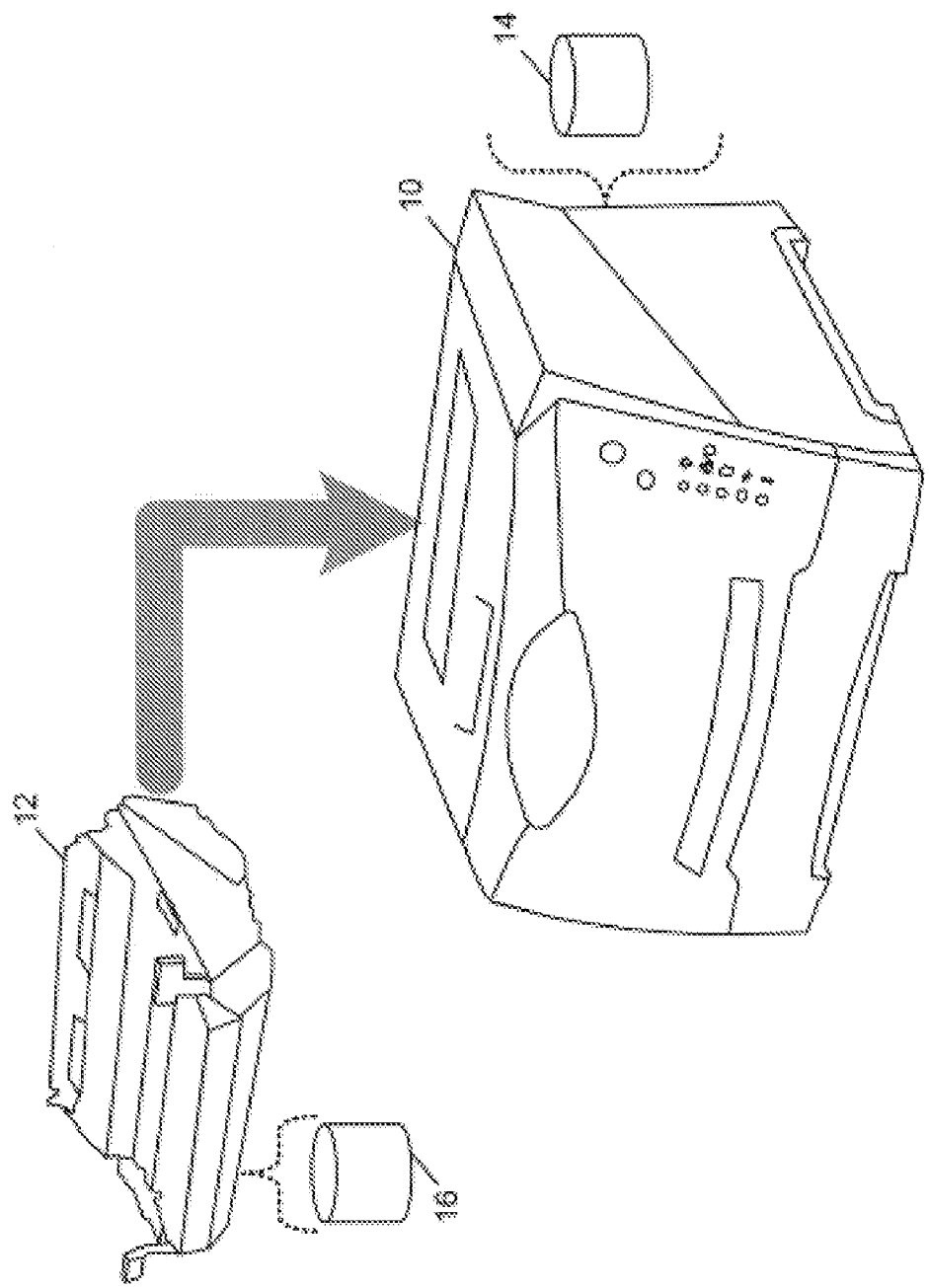
FIG. 1 is a diagrammatic view of an exemplary printing device and an exemplary printer cartridge for use within the printing device.

Referring to FIG. 1, there is shown an exemplary printing device 10 and an exemplary printer cartridge 12 for use within printing device 10. Printing device 10 may be coupled to a computing device (not shown) via e.g. a parallel printer cable (not shown), a universal serial bus cable (not shown), a network cable (not shown), and/or a wireless link (not shown). Printing device 10 is one type of image forming device for affixing images on a media. Image forming devices herein may include, e.g., electrophotographic printers, ink-jet printers, dye sublimation printers, thermal wax printers, electrophotographic copiers, electrophotographic multi-function devices, electrophotographic facsimile machines, or other types of image forming devices.

Exemplary printing device 10 may be a device that accepts text and graphic information from a computing device and may transfer the information to various forms of media (e.g., paper, cardstock, transparency sheets, etc.). Additionally, the printing device may accept input directly from a removable storage device (e.g., a thumb drive, a memory card, etc.). Further, printer cartridge 12 may be a component of exemplary printing device 10, which typically includes the consumables/wear components (e.g. a toner delivery assembly, etc.). Additionally, printer cartridge 12 may use various types of image-forming substances (e.g., toner, ink, dye, wax, etc.) for transferring textual and graphical information.

Printing device 10 may include a memory 14 (e.g., non-volatile memory, volatile memory, etc.) that is capable of electronically storing information. For example, memory 14 may include random access memory (RAM), read-only memory (ROM), static memory (e.g., SRAM), dynamic memory (e.g., DRAM) or other type of memory (e.g., non-volatile RAM (NVRAM)) or combinations of memory types. Memory 14 may also include a storage device that may implement one or more data storage techniques. For example, memory 14 may include a hard drive, CD-ROM, or other type of type of data storage device. In this embodiment, printer cartridge 12 also includes a memory 16 that may be implemented in a similar or different fashion compared to memory 14.

Memory 14 may store data associated with printing device 10. Such data may include information that uniquely identifies printing device 10 (e.g., printing device serial number, model number, etc.). The stored data may also include information representative of the geographical region in which printing device 10 was manufactured. Similarly, memory 16 may store data that may represent the geographical region in which printer cartridge 12 was manufactured. For printing device 10 to operate properly with printer cartridge 12, the geographic region data stored in memory 14 may need to match the geographic region data stored in memory 16. If the stored data sets do not match, printing device 10 may send a signal (e.g. to a connected computer system) as a mismatch alert. The printing device may also present a signal on a panel location on the printing device. Thus, moving printing device 10 from one geographical region (e.g., the United States) to another region (e.g., the Europe) may cause difficulties if most of the printer cartridges available in the new region (e.g., the Europe) were manufactured in the new region. To provide compatibility between printing device 10 and the printer cartridges, the geographical region setting stored in memory 14 may be adjusted to match the new location of the printing device.

Conventionally, the geographical region setting may be changed by bringing the printing devices to a technical support center. Alternatively, a technician may travel to the location of the printing device to change the geographical region setting. Both scenarios may be considered secure since the geographical region setting may be adjusted without the new setting being accessible by non-authorized personnel. However, transiting a printer device to and from a technical support center and/or having a technician travel may incur time delays and/or considerable costs. For example, a printing device may not be useable while in transit and/or while at a technical support center for the setting adjustment. By remotely changing the geographical region setting stored in memory 14, printing device 10 may be operational relatively quickly after being moved from one region to another. Additionally, by securely changing the region setting, the probability of setting tampering may be reduced. In addition to the regionalization setting, other setting may be changed by the technical support center and/or technician.

Figure 2:
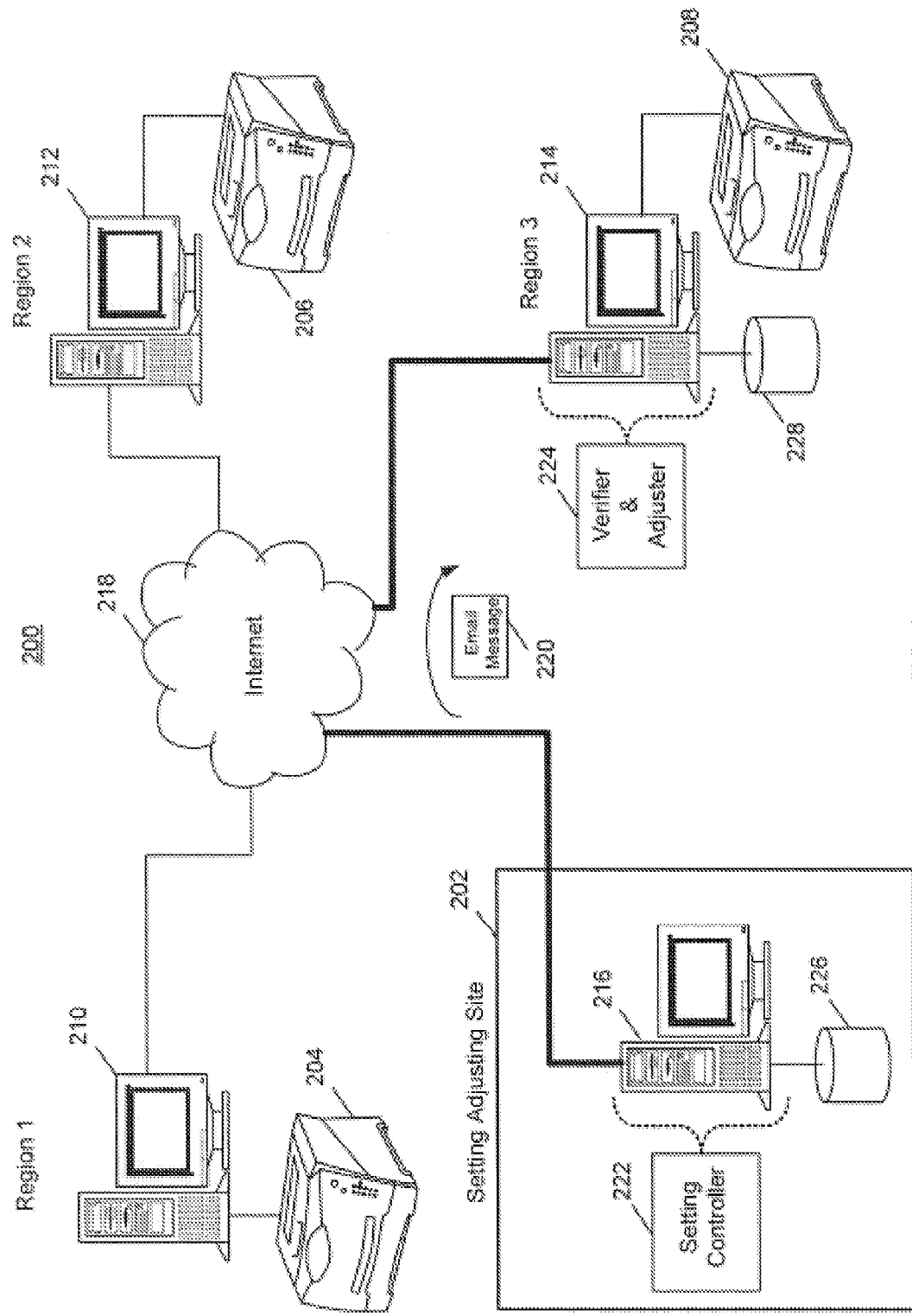
FIG. 2 is a diagrammatic view of a system for remotely and securely adjusting settings of printing devices.

Referring to FIG. 2, a system 200 is illustrated that may include a Setting Adjusting Site 202 that remotely and securely changes setting of printing devices in communication with the site. For illustrative purposes, system 200 may include printing devices 204, 206, 208 that may be located in different geographical regions (e.g., Region 1, Region 2, Region 3). Printing devices 204, 206 and 208 may be connected to respective computer system 210, 212 and 214. A computer system 216 may be included in Setting Adjusting Site 202 and may be in communication with Internet 218. Internet 218 may also be in communication with computer systems 210, 212 and 214, and/or printing devices 204, 206, and 208.

Due to this interconnectivity, data may be sent from Setting Adjusting Site 202 to one or more printing devices to change the geographical region setting stored at the printing devices. For example, if printing device 208 is moved from Region 1 to Region 3, data may be sent from Setting Adjusting Site 202 to printing device 208 (now located in region 3) via computer system 214 and Internet 218 or directly to printing device 208 via Internet 218. The data may be used to change the geographical region setting of printing device 208 from representing Region 1 to Region 3. By adjusting this setting, printer cartridges manufactured in Region 3 may be accepted by and properly operate with printing device 208.

One or more data transmission techniques may be implemented for sending data from Setting Adjusting Site 202 to printing device 208. In this embodiment an electronic mail (email) message 220 is sent from computer system 216 to computer system 214 via Internet 218 (highlighted by bold lines). Email message 220 may include data for changing one or more setting such as the geographical region setting of printing device 208. Additionally, the data may include information (e.g., serial number, model number, etc.) unique to printing device 208. This unique information may be used to verify the identity of printing device 208 prior to adjusting one or more setting. To send email message 220 to a proper location (e.g., computer system 214), an appropriate email address may be provided to Setting Adjusting Site 202.

In this embodiment, computer system 216 produces email message 220 and inserts data into the email message for adjusting the settings of printing device 208. To produce the data for adjusting the settings, computer system 216 may execute a Setting Controller 222. In some embodiments, Setting Controller 222 may comply with the Network Printing Alliance Protocol (NPAP) to produce a software component (e.g., a command, structure, data set, etc.) for adjusting the settings of printing device 208. To assure that the software component may only be used to change the setting(s) of printing device 208, information that uniquely identifies printer 208 may be included in the software component. Upon receipt, the unique identification information may be checked against identification data that may be stored locally at printing device 208.

Along with producing the software component, Setting Controller 222 may also secure the software component prior to being inserted into email message 220. By securing the software component, the probability of tampering (e.g., changing data, copying data, unwanted data distribution, etc.) may be reduced. To provide the security, one or more data securing techniques may be implemented. For example, a public key cipher (e.g., RSA, etc.) may be used to encrypt the software component and provide a layer of obfuscation that may prevent the encrypted data from being compromised. Individually or in combination with encryption, Setting Controller 222 may digitally sign the software component. For example, Setting Controller 222 may apply a hash function (i.e., a one-way algorithm that maps one set of data into another such that a hash value results every time for the data). One or more types of hash functions may be used for producing a digital signature. For example, a hashing function from the Secure Hash Algorithm (SHA) family (e.g., SHA1) may be implemented to produce a unique hash value that may be used to authenticate the software component received in email message 220.

Computer system 214 may receive email message 220 via an electronic mail system such as Microsoft Outlook™, Lotus Notes™ or other similar system capable of receiving and accessing email messages. A Verifier & Adjuster 224 may be executed by computer system 214 for using the software component included in email message 220. For example, Verifier & Adjuster 224 may use the software component to verify the identity of printing device 208 and, once verified, adjust the geographical region settings of the printing device.

Setting Controller 222 and/or Verifier & Adjuster 224 may each be implemented as a computer program product, e.g., a computer program tangible embodied in an information carrier, e.g., in a machine-readable storage device (e.g., RAM, ROM, hard-drive, CD-ROM, etc.) or in a propagated signal. The computer program product may be executed by or control the operation of, data processing apparatus, e.g., a programmable processor, a computer (e.g., computer system 214), or multiple computers. A computer program may be written in one or more forms of programming languages, including compiled or interpreted languages, and it can be deployed in any form, including as a stand-alone program or as a module, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network. Setting Controller 222 may also be stored in one or more files in memory (e.g., firmware) or in storage device (e.g., hard-drive, CD-ROM, etc.) such as storage device 226. Similarly, Verifier & Adjuster 224 may be stored in memory or in a storage device such as storage device 228. In some embodiments, Verifier & Adjuster 224 may reside and/or be stored in printing device 208.

Verifier & Adjuster 224 may perform one or more operations such as removing the security measures applied to the software component included in email message 220. For example, Verifier & Adjuster 224 may decrypt a public key cipher (e.g., decrypt an RSA cipher using an RSA keys index, RSA algorithm index and a public key). Verifier & Adjuster 224 may also authenticate the hash function applied by Setting Controller 222. For example, Verifier & Adjuster 224 may compute a message authentication code (MAC) such as a keyed-hash message authentication code (HMAC). In general, a MAC may be calculated using a hash function in combination with a secret key. Once computed, the MAC may then be used to verify and authenticate the integrity of the data sent in email message 220.

Referring to FIG. 3, a table 300 is presented that includes content representative of the software component that may be included in email message 220. In this particular embodiment, table 300 represents the contents of a printing device command that may be used to change one or more settings of a printing device (e.g., printing device 208). This printing device command may be compliant with one or more protocols. For example, the command may be compatible with the NPAP. In general, the NPAP defines a bidirectional mode of communication between a computer system and a compatible printing device for providing status information of the printing device to the computer system. As shown in table 300, the printing device command includes data 302 that may be used for decrypting the command. Additionally, the printing device command includes data 304 that may be used for authenticating and verifying the command.

To verify that the printing device command may be used to adjust settings stored in a particular printing device, the command includes data that may be used for identifying the printing device. In this embodiment, data 306 includes information (e.g., model name, serial number, original equipment manufacturer (OEM), device family, etc.) that may be uniquely associated with the target printing device. To adjust one or more settings stored in the printing device, the printing device command includes data 308. For example, data 308 includes data that may be used for adjusting the geographical region setting of the printing device.

Referring to FIG. 4, a table 400 is presented that is representative of content that may be provided by a printing device is response to the device command (represented in FIG. 3). In this embodiment, the response may verify that the printing device command executed and appropriately performed (e.g., adjusted the geographical region setting of the printing device). Alternatively, the printing device response may indicate that the printing device command did not complete a task (e.g., adjust a setting). For example, data 402 included in the response may indicate one of several events may have caused in improper execution of the command. For example, data representing the encryption version included in the printing device command may not match the version of the actual encryption used for encrypting the printing device command. Detecting that the printing device may not have been correctly identified may also halt a setting adjustment. For example, if the printing device serial number stored in the command (see data 308 of FIG. 3) does not match the serial number stored in the printing device (e.g., stored in memory 14), a response may be sent that includes data indicative of this event. Other data may also be included in the printing device response. For example, data 404 represents that a textual comment may be returned from the printing device.

Figures 5, 6:
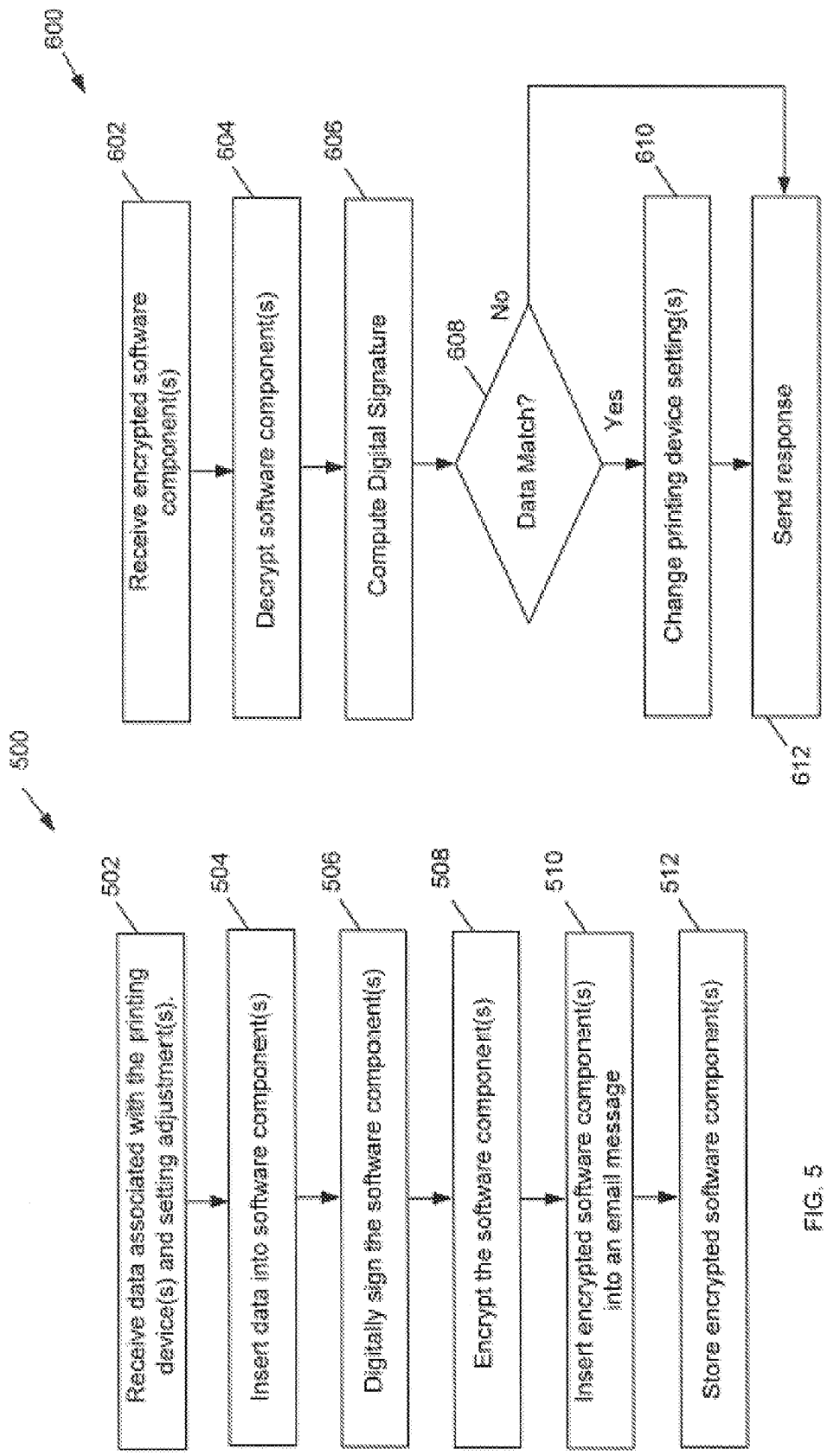
FIG. 5 is a flowchart that includes some operations of a Setting Controller shown in FIG. 2.
FIG. 6 is a flowchart that includes some operations of a Verifier & Adjuster shown in FIG. 2.

Referring to FIG. 5, a flow chart is shown that represents some of the operations of Setting Controller 222. For example, some operations may include receiving 502 data that may be sent to one or more printing devices for adjusting one or more printing settings. For example, a serial number, OEM and model number associated with a particular printing device may be received. Additionally data associated with one or more setting adjustments may be received. For example, data may be received that represents a new geographical region setting for the printing device. Operations may also include inserting 504 the data (e.g., serial number, model number, new setting, etc.) into one or more software components (e.g., a printing device command) that may be used to adjust the setting(s) of the target printing device. Operations may also include digitally signing 506 the software component (e.g., produce a unique hash value and insert the hash value into the software component). Operations may also include encrypting 508 the software component and inserting 510 the encrypted software component into an email message for transmission to the location of the target printing device. In some embodiments, operations may also include storing 512 the encrypted software component to a storage device such as a hard drive, CD-ROM, etc.

Referring to FIG. 6, a flow chart 600 is shown that represents some of the operations of Verifier & Adjuster 224 (shown in FIG. 2). For example, some operations may include receiving 602 an encrypted software component. As mentioned above, the encrypted software component may be inserted into an email message and sent from a remote location such as Setting Adjusting Site 202 (shown in FIG. 2). Operations may also include decrypting 604 the software component (e.g., a printing device command) such that the decrypted software component may be used to verify the identity of the target printing device. Once the identification is verified, the decrypted software component may be used to change one or more settings stored in the printing device. Operations may also include computing 606 a digital signatures from the data included in the decrypted software component. By computing the digital signature, the digital signature (e.g., hash value) stored in the software component may be verified for authenticating the integrity of the software component.

Operations may also include determining 608 if data stored in the software component matches data that may be locally stored at the printing device. For example, data stored in the software component that represents the serial number, model number, OEM, etc. of the printing device may be compared to data representing the same information stored in the printing device. By matching the data that is uniquely associated with the target printing device, the identity of the target printing device may be verified. Also, the digital signature stored in the software component may be compared to the digital signature computed in step 606. By matching the digital signatures, the content of the software component may be authenticated. In this embodiment, if the data being compared matches, operations of Verifier & Adjuster 224 may include changing 610 one or more settings of the printing device. For example, the geographical region setting of the printing device may be changed to reflect a recent move of the printing device. Operations may also include sending 612 a response to indicate that one or more parameters may have changed or that a data mismatch was detected (See step 608). For example, a software component (e.g., printing device response represented by table 400) may be sent from the printing device to a computer system (e.g., computer system 214) or other device in communication with the printing device. Additionally, the response may be placed in another email message for transmission back to Setting Adjusting Site 202 for further analysis.

A number of implementations have been described. Nevertheless, it will be understood that various modifications may be made. Accordingly, other implementations are within the scope of the following claims.

What is claimed is:

1. A system, comprising:
a setting controller configured to initiate sending data to an image forming device at a remote location, wherein the secured data is unique to the image forming device; and
a verifier and adjuster configured to initiate comparing, at the remote location, the secured data to data stored at the image forming device to verify the identity of the image forming device, wherein, if the identity of the image forming device is verified, the verifier and adjuster initiates a setting adjustment of the image forming device based on, at least in part, the secured data.

2. The system of claim 1, wherein the secured data is sent in an electronic mail message.

3. The system of claim 1, wherein the secured data includes encrypted data.

4. The system of claim 1, wherein the secured data includes a digital signature.

5. The system of claim 1, wherein the secured data includes data that is selected from a group consisting of a model name of the image forming device, a serial number of the image forming devices, an original equipment manufacturer (OEM) of the image forming device, a device family, and combinations of the foregoing.

6. The system of claim 1, wherein the image forming device includes a printer.

7. The system of claim 1, wherein the setting adjustment includes a geographical region setting adjustment.

8. A method, comprising:
sending secured data to an image forming device at a remote location, wherein the secured data is unique to the image forming device;
comparing, at the remote location, the secured data to data stored at the image forming device for verifying the identity of the image forming device; and
if the identity of the image forming device is verified, initiating a setting adjustment of the image forming device based on, at least in part, the secured data.

9. The method of claim 8, wherein the secured data is secured by one of the following encryption, digital signing, and combinations, of the foregoing.

10. The method of claim 8, wherein comparing the secured data to the data stored at the image forming device includes decrypting the secured data.

11. The method of claim 8, wherein comparing the secured data to the data stored at the image forming device includes authenticating a digital signature.

12. The method of claim 8, further comprising:
producing a response to represent one of verification and non verification of the identity of the image forming device.

13. The method of claim 8, wherein the setting adjustment includes a geographical region setting adjustment.

14. A method, comprising:
sending, by an image forming device, a request for an adjustment of a setting corresponding to the image forming device;
receiving secured data responsive to the sending;
comparing, at the image forming device, the secured data to data stored at the image forming to verify the identity of the image forming device, wherein the secured data is received from a remote location and is unique to the image forming device; and
if the identity of the image forming device is verified, adjusting the setting of the image forming device based on, at least in part, the secured data.

15. The method of claim 14, wherein the secure data is transmitted in a electronic mail message from the remote location.

16. The method of claim 14, wherein the secure data includes encrypted data.

17. The method of claim 14, wherein the secure data includes a digital signature provided by a hashing function.

18. The method of claim 14, wherein comparing the secured data to the data stored occurs in a printer.

19. An article comprising:
a first storage medium storing instructions that when executed by a machine result in sending secured data to an image forming device at a remote location, wherein the secured data is unique to one of the image forming device and class of image forming device;
a second storage medium storing instructions which when executed by a second machine results in comparing, at the remote location, the secured data to data stored at the image forming device for verifying one of the identity of the image forming device and class of image forming device; and
if one of the identity of the image forming device and class of imaging device is verified, initiating a setting adjustment of the image forming device based on, at least in part, the secured data.

20. The article of claim 19, wherein the secured data is secured by one of the following encryption, digital signing, and combinations of the foregoing.

21. The article of claim 19, wherein comparing the secured data to the data stored at the image forming device includes decrypting the secured data.

22. The article of claim 19, wherein comparing the secured data to the data stored at the image forming devices authenticating a digital signature.

23. The article of claim 19, wherein said instructions that when executed by said machine result in the following additional operations:
producing a response to represent verification of the identity of the image forming device.

24. The article of claim 19, wherein the setting adjustment includes a geographical region setting adjustment.

25. An article comprising:
a storage medium storing instructions that when executed by a machine result in the following operations:
sending, by an image forming device, a request for an adjustment of a setting corresponding to the image forming device;
receiving secured data responsive to the sending;
comparing secured data to data stored at the image forming device to verify the identity of the image forming device, wherein the secured data is received from a remote location and is unique to the forming device; and
if the identity of the image forming device is verified, adjusting the setting of the image forming device based on, at least in part, the secured data.

26. The article of claim 25, wherein the secure data is transmitted in an electronic mail message from the remote location.

27. The article of claim 25, wherein the secure data includes encrypted data.

28. The article of claim 25, wherein the instructions are executed in a printer.

29. The article of claim 25, wherein the setting adjustment includes a geographical setting adjustment.

30. A method, comprising:
receiving secured data following an electronics device being moved from one geographical region to another geographical region;
comparing at the electronics device the secured data to data stored at the electronics device to verify the identity of the electronics device, wherein the secured data is received from a remote location and is unique to the electronics device; and
if the identity of the image forming device is verified, adjusting a setting of the image forming device based on, at least in part, the secured data.

31. The method of claim 30, wherein the electronics device comprises imaging device.

32. The method of claim 30, wherein the setting adjusted allows for the electronics device to function with a component of the electronics device purchased in the moved-to geographical region, wherein the electronics device would not otherwise function with the component.

33. The method of claim 32, wherein the removable component comprises a consumable or replaceable supply item.

* * * * *